(12) United States Patent
Navarro

(10) Patent No.: US 11,690,483 B2
(45) Date of Patent: Jul. 4, 2023

(54) COOKWARE SYSTEM WITH REMOVABLE HANDLES

(71) Applicant: FAMATEL USA LLC, Dania Beach, FL (US)

(72) Inventor: Carlos Jose Latre Navarro, Barcelona (ES)

(73) Assignee: FAMATEL USA LLC, Dania Beach, FL (US)

( * ) Notice: Subject to any disclaimer, the term of this patent is extended or adjusted under 35 U.S.C. 154(b) by 138 days.

(21) Appl. No.: 17/377,975

(22) Filed: Jul. 16, 2021

(65) Prior Publication Data

US 2023/0014523 A1    Jan. 19, 2023

(51) Int. Cl.
*A47J 45/07* (2006.01)

(52) U.S. Cl.
CPC .................................. *A47J 45/071* (2013.01)

(58) Field of Classification Search
CPC ........... A47J 45/071; A47J 45/07; A47J 45/10
USPC .................................... 220/759, 753; 16/422
See application file for complete search history.

(56) References Cited

U.S. PATENT DOCUMENTS

| | | | |
|---|---|---|---|
| 735,516 A * | 8/1903 | Horton | A47J 45/071 |
| | | | 220/759 |
| 1,189,957 A * | 7/1916 | Jewell | A47J 45/071 |
| | | | 220/759 |
| 1,473,335 A * | 11/1923 | Chandler | A47J 45/061 |
| | | | 220/759 |
| 1,943,585 A * | 1/1934 | Cummins | A47J 45/071 |
| | | | 220/759 |
| 2,494,159 A | 1/1950 | Bernstein | |
| 2,784,996 A * | 3/1957 | Schaefer | A47J 45/10 |
| | | | D7/395 |
| 6,298,775 B1 * | 10/2001 | Chen | A47J 45/061 |
| | | | 99/422 |
| 2003/0208884 A1 * | 11/2003 | Kahler | A47J 45/071 |
| | | | 16/422 |
| 2005/0204929 A1 * | 9/2005 | Rosenzweig | A47J 37/1295 |
| | | | 99/403 |
| 2015/0053707 A1 * | 2/2015 | Borovicka | A47J 45/071 |
| | | | 220/759 |

(Continued)

FOREIGN PATENT DOCUMENTS

| | | | | |
|---|---|---|---|---|
| CN | 204049204 U | * | 12/2014 | |
| GB | 2329142 A | * | 3/1999 | ............ A47J 45/071 |

*Primary Examiner* — J. Gregory Pickett
*Assistant Examiner* — Niki M Eloshway
(74) *Attorney, Agent, or Firm* — Sunstein LLP

(57) ABSTRACT

A cookware system, including a cookware member, with an internal region for heating food and an outer edge disposed about a perimeter of the cookware member. The outer edge including a first pair of adjacent slots extending through a thickness of the outer edge and inwardly from the perimeter; the first pair of slots defining a first notch having a top surface and a bottom surface. There is a first removable handle, including a grip member at a first end, an engagement member at a second end, and an extension member interconnecting the grip member to the engagement member. The engagement member includes a first leg, a second leg, a first crossbar, and a second crossbar; and the first crossbar is interconnected between the first leg and the second leg and the second crossbar is spaced from the first crossbar and interconnected between the first leg and the second leg.

19 Claims, 8 Drawing Sheets

(56) References Cited

U.S. PATENT DOCUMENTS

2018/0020865 A1* 1/2018 Oh ..................... A47J 27/002
                                                        220/759
2021/0393084 A1* 12/2021 Henry ..................... B25B 9/02

* cited by examiner

COOKWARE SYSTEM WITH REMOVABLE HANDLES

TECHNICAL FIELD

The present invention relates cookware system with removable handles and more particularly to an item of cookware made of a metallic or non-metallic material, which has removable handles, and which is configured for cooking on a barbeque grill.

BACKGROUND ART

Grilling has a long and colorful history in the United States and around the world. It took centuries of experimentation and innovation to find the perfect way to grill up juicy cuts of meat without burning the food. In the United States, Memorial Day weekend is the kickoff to summer and that means families will be lighting their grills in parks and backyards all over the country.

Beyond cooking hot dogs and hamburgers, people are using their grills to cook a wider variety of foods, including pizza. Grilling pizza is a favorite because it provides an added smoky flavor that is unmatched by any oven. Pizza can be cooked on the grill using a metal baking sheet, but by using a ceramic or other non-metallic material, such as a pizza stone, better results can be obtained. The ceramic stone holds heat more evenly and the porous surface draws water out of particularly wet areas of the dough as it cooks. In addition, when you preheat the stone, it gives the dough a strong burst of initial heat, puffing up the crust. A ceramic stone can be used to improve the grilling other foods including fish, bread, and other food products that would typically need to be placed on a metal pan when cooked.

In order to remove the ceramic stone from the grill when the food has cooked and the stone is still hot, a typical pizza spatula may be used, but often the stone is quite heavy and hot and it may be unsteady and therefore unsafe to remove the stone in this manner. Some manufacturers have provided fixed handles on their ceramic stones so that the they may be lifted directly from the grill by hand; however, since the stones may be too hot to remove using bare hands oven mitts must be used.

Other types of cookware may be used to cook food on a grill and achieve different/more desirable results than cooking food indoors in an oven or on a stovetop. These may include pots, pans, and woks, for example. However, they also suffer from the same issues that people encounter when using a pizza stone on an outdoor grill There is therefore a need for cookware, which can be easily and safely placed on, manipulated, and removed from an outdoor grill.

SUMMARY OF THE EMBODIMENTS

The benefits and advantages of the present invention over existing systems will be readily apparent from the Summary of the Embodiments and the Detailed Description of Specific Embodiments to follow. One skilled in the art will appreciate that the present teachings can be practiced with embodiments other than those summarized or disclosed below.

In accordance with one embodiment there is a cookware system comprising a cookware member. The cookware member includes an internal region for heating food and an outer edge disposed about a perimeter of the cookware member; the outer edge including a first pair of adjacent slots extending through a thickness of the outer edge and extending inwardly from the perimeter, the first pair of slots defining a first notch having a top surface and a bottom surface. There is a first removable handle, including a grip member at a first end, an engagement member at a second end, and an extension member interconnecting the grip member to the engagement member. The engagement member includes a first leg, a second leg, a first crossbar, and a second crossbar and the first crossbar is interconnected between the first leg and the second leg and the second crossbar is spaced from the first crossbar and interconnected between the first leg and the second leg. The first removable handle is configured to removeably connect with the cookware member when the first leg of the engagement member is inserted into one of the slots of the first pair of adjacent slots in the outer edge of the cookware member and the second leg of the engagement member is inserted into the other of the slots of the first pair of adjacent slots in the outer edge of the cookware member and when the first crossbar member engages with a the top surface of the first notch and the second crossbar member engages with the bottom surface of the first notch.

In one or more embodiments the following features may be included. The extension member of the first removable handle may include a longitudinal axis and the first and second legs of the engagement member may extend in a direction which is transverse to the longitudinal axis of the extension member. The first cross bar may be spaced from the second cross bar along a length of the first and second legs and the first cross bar may be offset from the second crossbar in a direction perpendicular to the length of the first and second legs. The first and second legs of the engagement member each may include curved portions extending from the extension member, which transition to straight portions, and wherein the first crossbar member and the second crossbar member connect to the straight portions of the first and second leg members. The extension member may include a first leg and a second leg, which, respectively, interconnect with the first leg and the second leg of the engagement member. The extension member may comprises a monolithic member, and the first leg and the second leg of the engagement member may interconnect with the monolithic member. The bottom surface of the first notch may include a groove configured to receive the second crossbar member.

In one or more embodiments the following additional features may be included. The outer edge of the cookware member may further include a second pair of adjacent slots extending through the thickness of the outer edge and extending inwardly from the perimeter, the second pair of slots defining a second notch having a top surface and a bottom surface. There may further be included a second removable handle including a grip member at a first end, an engagement member at a second end, and an extension member, interconnecting the grip member to the engagement member. The engagement member may include a first leg, a second leg, a first crossbar and a second crossbar. The first crossbar may be interconnected between the first leg and the second leg and the second crossbar may be spaced from the first crossbar and interconnected between the first leg and the second leg. The second removable handle may be configured to removeably connect with the cookware member when the first leg of the engagement member is inserted into one of the slots of the second pair of adjacent slots in the outer edge of the cookware member and the second leg of the engagement member is inserted into the other of the slots of the second pair of adjacent slots in the outer edge of the cookware member and when the first crossbar member engages with a the top surface of the second notch and the second crossbar member engages with the bottom surface of the second notch. The extension member of the second removable handle may include a longitudinal axis and the first and second legs of the engagement member may extend in a direction which is transverse to the longitudinal axis of the first removable handle. The first cross bar may be spaced from the second cross bar along a length of the first and second legs and the first cross bar may be offset from the second crossbar in a direction perpendicular to the length of the first and second legs. The first and second legs of the engagement member each may include curved portions extending from the extension member, which transition to straight portions, and wherein the first crossbar member and the second crossbar member connect to the straight portions of the first and second leg members. The extension member may include a first leg and a second leg, which, respectively, interconnect with the first leg and the second leg of the engagement member. The extension member may comprise a monolithic member, and wherein the first leg and the second leg of the engagement member interconnect with the monolithic member.

In one or more embodiments the following features may additionally be included. The bottom surface of the second notch may include a groove configured to receive the second crossbar member. The first notch and the second notch may be disposed opposite each other about the perimeter of the cookware member. The cookware member may be one of circular, square, rectangular, non-geometric, or decorative in shape. The outer edge of the cookware member and the internal region may be substantially co-planar and may be in the form of a substrate. The cookware member may be formed of one of a metallic or a non-metallic material. The grip member of the first removable handle may extend outwardly away from the outer edge and internal region of the cookware member and the grip member of the second removable handle may extend outwardly away from the outer edge and internal region of the cookware member, such that the user can grasp the grip member of the first removable handle with the a first hand and simultaneously grasp the grip member of the second removable handle with a second hand to enable two handed lifting of the cookware member.

The grip member of the first removable handle may include an orifice configured to receive a first digit of a user and the grip member of the second removable handle may include an orifice configured to receive a thumb of a user; and wherein the first removable handle and the second removable handle are configured to rotate up and inwardly toward the interior region of the cookware member, such that the user can engage the orifice in the in the grip member of the first removable handle with the first digit and simultaneously engage the orifice in the in the grip member of the second removable handle with the thumb to enable one handed lifting of the cookware member. The cookware member may be one of a ceramic stone, a pot, a pan, or a wok.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
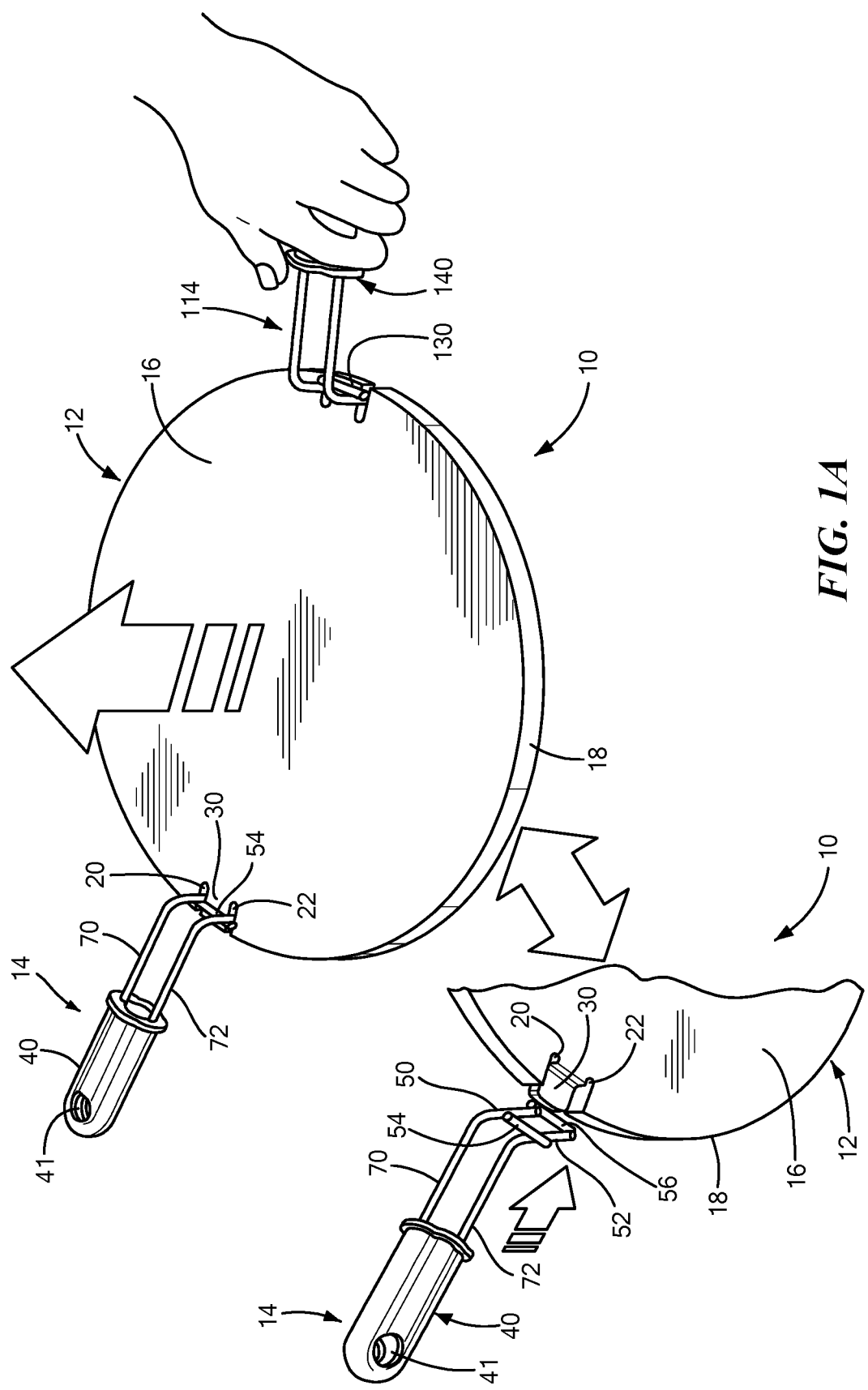
FIG. 1A is a perspective view of an embodiment of the cookware system with removable handles.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure.

The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms cookware and/or a cookware member as used herein include any cooking device or structure made of a ceramic, or other non-metallic material, or a metallic material having various structures, including flat, substrate like structures or they can also take the form of a pot, pan, wok, or any other type of cookware. The cookware may be circular, square, rectangular, non-geometric, or decorative in shape.

Figure 1B:
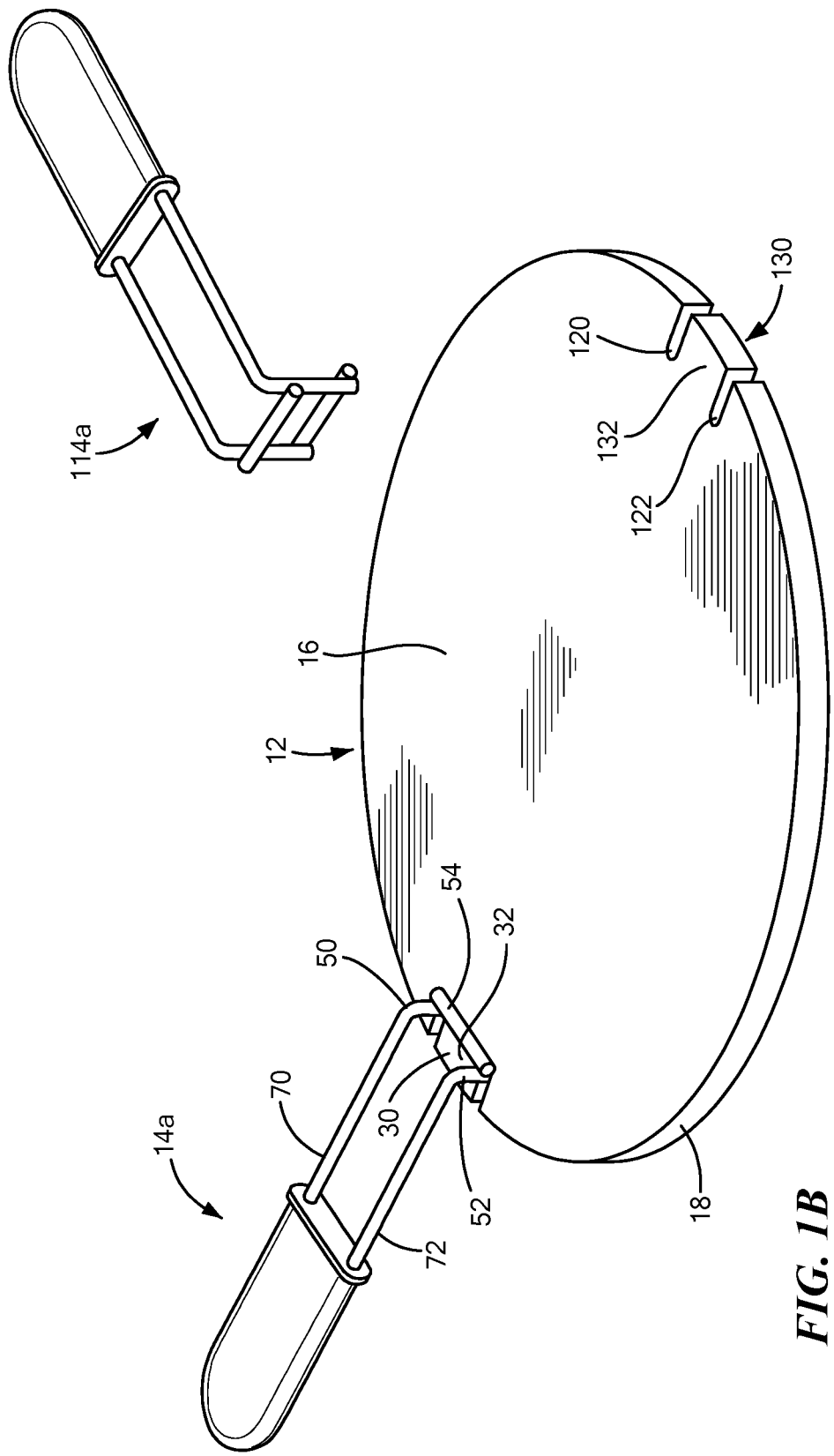
FIG. 1B is a perspective view of an embodiment of the cookware system similar to that shown in FIG. 1A but with different removable handles.
Figure 1C:
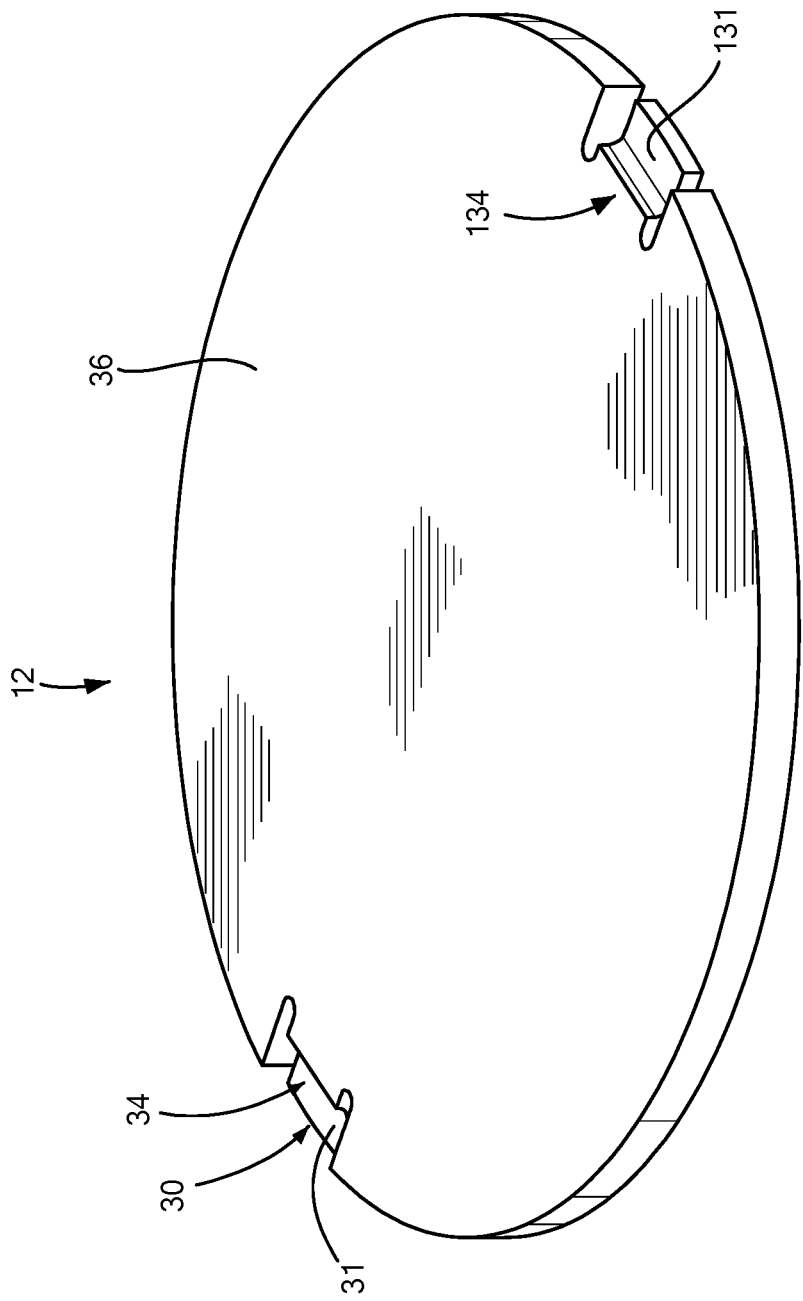
FIG. 1C is a perspective view of the bottom surface of the the cookware system with removable handles of FIG. 1B.

Referring to FIGS. 1A-1C there is shown a cookware system 10, according to one aspect of this disclosure, which includes a cookware member 12 and a first removable handle 14. Cookware member 12 is depicted as a round and flat cooking stone, which may be made of a non-metallic material, such as ceramic. This is provided only as an example of one of many possible configurations of the cookware system described herein. This type of cookware member is particularly well suited to cook pizza or bread, for example, on a grill. As indicated above, the cookware member of the cookware system may be made of various materials and take on different forms and shapes.

Cookware member 12 includes an internal region 16, which in this case is a surface of the flat cooking stone on which food may be heated. There is an outer edge 18 disposed about the perimeter of the cookware member 12. In a first portion of outer edge 18 there is formed a first pair of adjacent slots 20 and 22, which extend through the thickness of the cookware member 12 and extend inwardly from the perimeter towards the internal region 16. In this example, the outer edge of the cookware member and the internal region are substantially co-planar and in the form of a substrate. Between the first pair of slots 20 and 22 there is defined a first notch 30, having a top surface 32 (depicted in FIG. 1B) and a bottom surface 34, which is part of and/or formed in bottom surface 36 of cookware member 10, depicted in FIG. 1C.

Figure 2A:
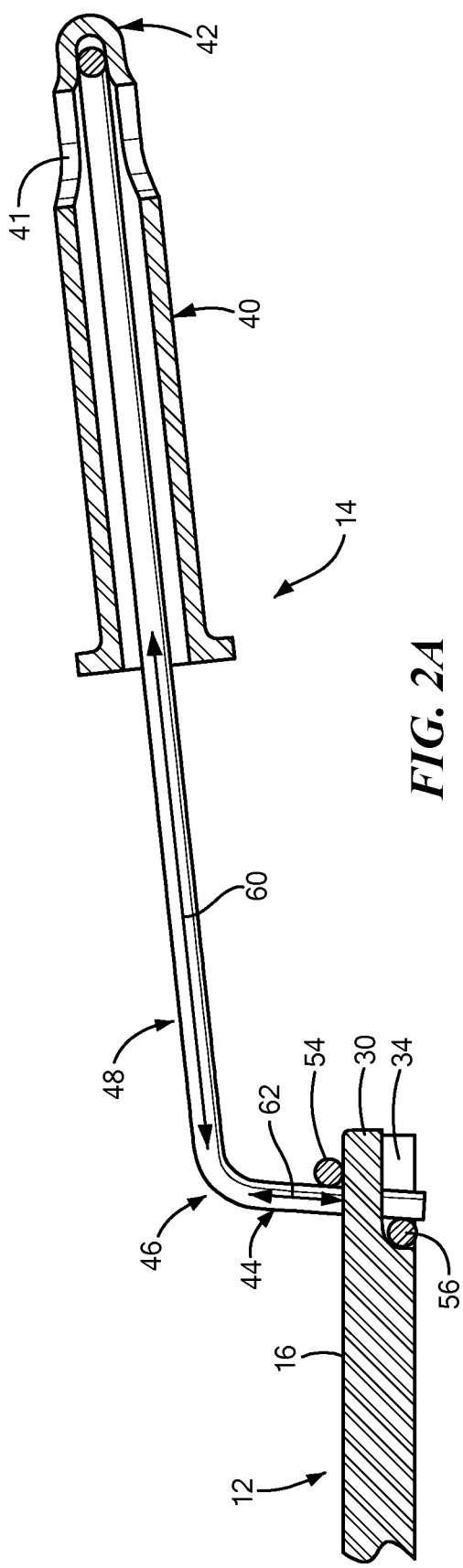
FIG. 2A is a partial cross-section view of the cookware system of FIG. 1A depicting one of the removable handles.

Referring to FIG. 2A, shown in a cross-sectional view is a first removable handle 14, which includes a grip member 40 at a first end 42, an engagement member 44 at a second end 46, and an extension member 48 interconnecting the grip member 40 to the engagement member 44. There may be included through grip member 40 an orifice 41 to allow first removable handle 14 to be held by a user and/or to be hung on a hook. Referring to FIGS. 1A and 1B, engagement member 44 includes a first leg 50, a second leg 52, a first crossbar 54, and a second crossbar 56. The first crossbar 54 is interconnected between the first leg 50 and the second leg 52 and the second crossbar 56 is spaced from the first crossbar 54 and it is also interconnected between the first leg 50 and the second leg 52.

Continuing to refer to FIGS. 1A, 1B, and 2A, it is shown that the first removable handle 14 is configured to be removeably connected with cookware member 12 when the first leg 50 of the engagement member 44 is inserted into slot 20 of the first pair of adjacent slots in the outer edge 18 of the cookware member 12 and the second leg 52 of the engagement member 44 is inserted into the other slot 22 of the first pair of adjacent slots. When this occurs the first crossbar member 54 engages with a top surface 32 of the first notch 30 and the second crossbar 56 member engages with the bottom surface 34 of the first notch 30. While not required, the bottom surface 34 of the first notch 30 may include a groove 31 to receive the second crossbar member 56. As shown in FIGS. 1A and 2A, there may be included through grip member 40 an orifice 41 to allow first removable handle 14 to be held by a user and/or to be hung on a hook. In the embodiment of FIG. 1B removable handle 14a does not include such an orifice.

Further describing the construction of removable handle 14, the extension member 48 includes a longitudinal axis 60 (FIG. 2A) and first leg 50 and second leg 52 of the engagement member 44 extend in a direction (indicated by longitudinal axis 62), which is transverse to the longitudinal axis 60 of the extension member 48. The first cross bar 54 is spaced from the second cross bar 56 along a length of the first leg 50 and second leg 52 (i.e. in the direction of longitudinal axis 62) and wherein the first cross bar 54 is offset from the second crossbar 56 in a direction perpendicular to the length of the first leg 50 and second leg 56.

Additionally, it should be noted that, while not a requirement of the design of the removable handle 14, it is advantageous to structure the first leg 50 and second leg 52 of the engagement member 44 with curved portions which interconnect with the extension member and transition to straight portions on which the first crossbar member 54 and the second crossbar member 56 connect. In this embodiment, the extension member includes a first leg 70 and a second leg 72, which, respectively, interconnect with the first leg 50 and the second leg 52 of the engagement member 44. Legs 70 and 72 of extension member 44 may extend into the grip member 40 and over the legs may be disposed a grip or handle made of plastic or other suitable material to provide good thermal insulation and to form an exterior surface of grip member 40. While an integrated construction as described is preferred, the grip member 40 may be separately constructed and interconnected to extension member 44.

In certain applications, where the cookware member is made of a lighter material and lighter foods are expected to be cooked, only one removable handle may be used. However, where the cookware member is heavier and/or the food to be cooked is expected to be heavy, the cookware system 10 may include a second removable handle 114 (FIGS. 1A and 1B), which can engage with outer edge 18 of the cookware member 10 via a second pair of adjacent slots, i.e. slots 120 and 122, extending through the thickness of the outer edge and extending inwardly from the perimeter of the cookware member 12.

Figure 2B:
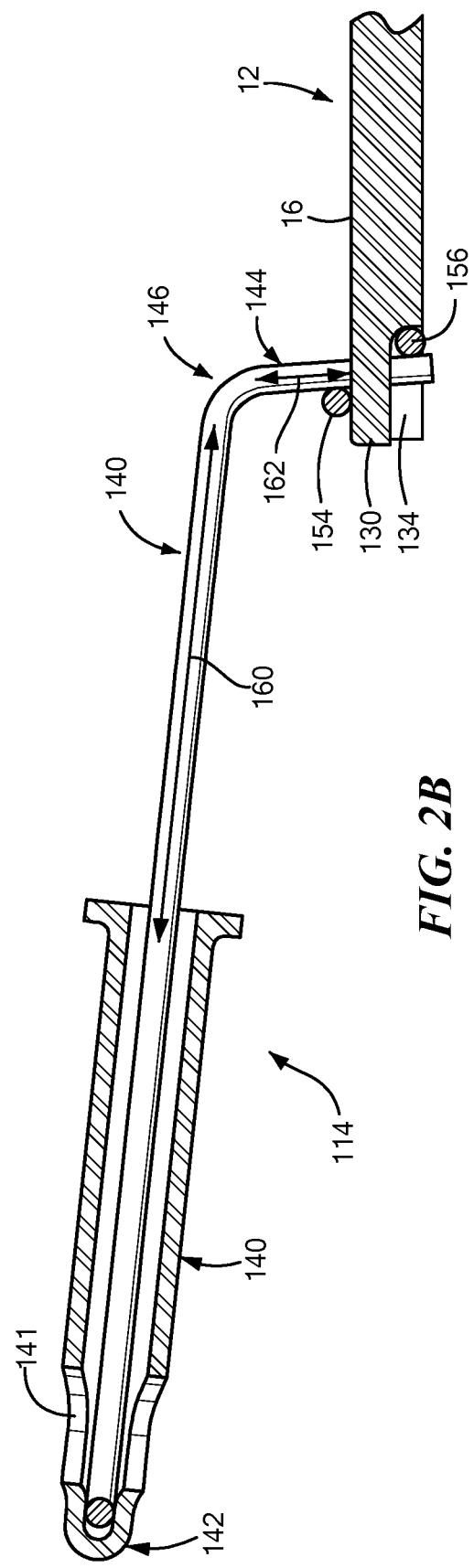
FIG. 2B is a partial cross-section view of the cookware system of FIG. 1A depicting the other of the removable handles.

The second pair of slots 120 and 122 define a second notch 130, having a top surface 132 (depicted in FIG. 1B) and a bottom surface 134, which is part of and/or formed in bottom surface 36 of cookware member 10, as depicted in FIG. 1C. Bottom surface 134 may include a groove 131 for engaging with one of the cross-bars of the second removable handle 114, as described below. Referring now to FIG. 2B, second removable handle 114, is shown to include a grip member 140 at a first end 142, an engagement member 144 at a second end 146, and an extension member 148 interconnecting the grip member 140 to the engagement member 144. There may be included through grip member 140 an orifice 141 to allow second removable handle 114 to be held by a user and/or to be hung on a hook.

Engagement member 144 includes a first leg 150, a second leg 152, a first crossbar 154, and a second crossbar 156. The first crossbar 154 is interconnected between the first leg 150 and the second leg 152 and the second crossbar 156 is spaced from the first crossbar 154 and it is also interconnected between the first leg 150 and the second leg 152. Referring to FIGS. 1A, 1B, and 2, it is shown that the second removable handle 114 is configured to be removeably connected with cookware member 12. This occurs when the first leg 150 of the engagement member 144 is inserted into slot 120 of the second pair of adjacent slots in the outer edge 18 of the cookware member 12 and the second leg 152 of the engagement member 144 is inserted into the other slot 122 of the second pair of adjacent slots. When this occurs, the first crossbar member 150 engages with a the top surface 132 of the second notch 130 and the second crossbar 156 member engages with the bottom surface 134 of the second notch 130. While not required, the bottom surface 134 of the first notch 30 may include a groove 131 to receive the second crossbar member 156.

Further describing the construction of second removable handle 114, the extension member 148 includes a longitudinal axis 160 (FIG. 2A) and first leg and second legs of the engagement member 144 extend in a direction (indicated by longitudinal axis 162), which is transverse to the longitudinal axis 160 of the extension member 148. The first cross bar 154 is spaced from the second cross bar 156 along a length of the first leg 150 and second leg 152 (i.e. in the direction of longitudinal axis 162) and wherein the first cross bar 154 is offset from the second crossbar 156 in a direction perpendicular to the length of the first leg 150 and second leg 156.

Figure 3:
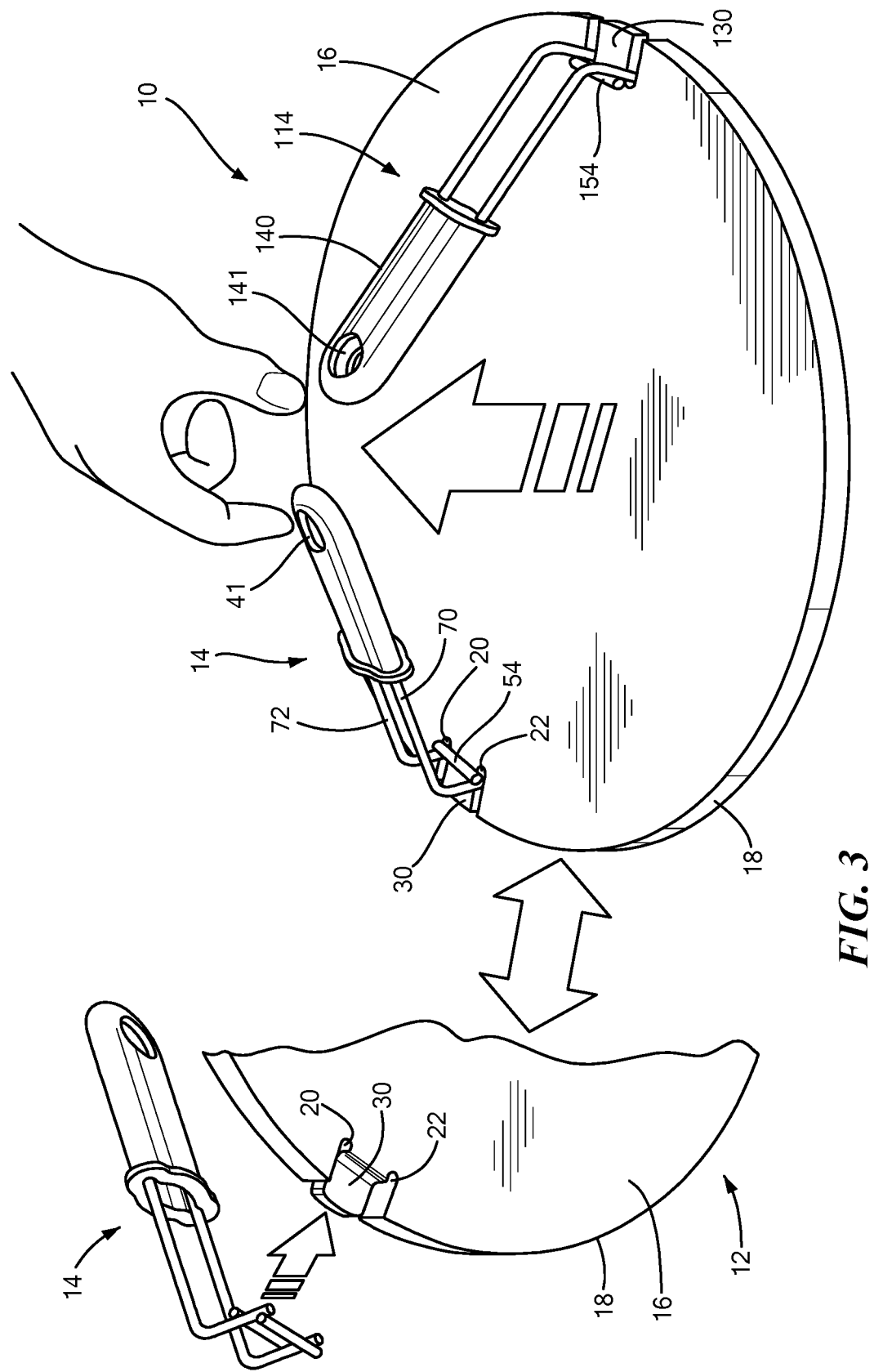
FIG. 3 is a perspective view of the embodiment of the cookware system with removable handles shown in FIG. 1A depicting an alternate way to use the handles to lift the cookware member.

The removable handles 14 and 114 may be used in at least two different ways to place cookware member 12 on a grill, to remove it from the grill, and to manipulate/move cookware member 12 while on a grill. These two ways are depicted in FIGS. 1A and 1n FIG. 3. Referring to FIG. 1A, the grip member 40 of the first removable handle 14 extends outwardly away from the outer edge 18 and internal region 16 of the cookware member 12 and the grip member 140 of the second removable handle 114 extends outwardly away from the outer edge 18 and internal region 16 of cookware member 12. In this configuration, the user can grasp each of the grip members of the removable handles by hand, using both hands to lift cookware member 12.

The removable handles may be configured to allow a user to manipulate the cookware member with a single hand, as depicted in FIG. 3. In this case, orifice 41 of the grip member 40 of the first removable handle may receive a first digit of a user and orifice 141 of grip member 140 of the second removable handle 114 may receive a thumb of a user. A user may engage grip members 40 and 140 when the first removable handle 14 and the second removable handle 114 are rotated up and inwardly toward the interior region of the cookware member 12, By positioning the removable handles in this way, the orifice 41 in grip member 40 of the first removable handle 14 can be engaged by a user with a first digit of the user's hand and simultaneously the grip member 140 of the second removable handle 114 can be engaged by the user with the thumb of the user's hand to enable one handed lifting of the cookware member 12.

Figure 4:
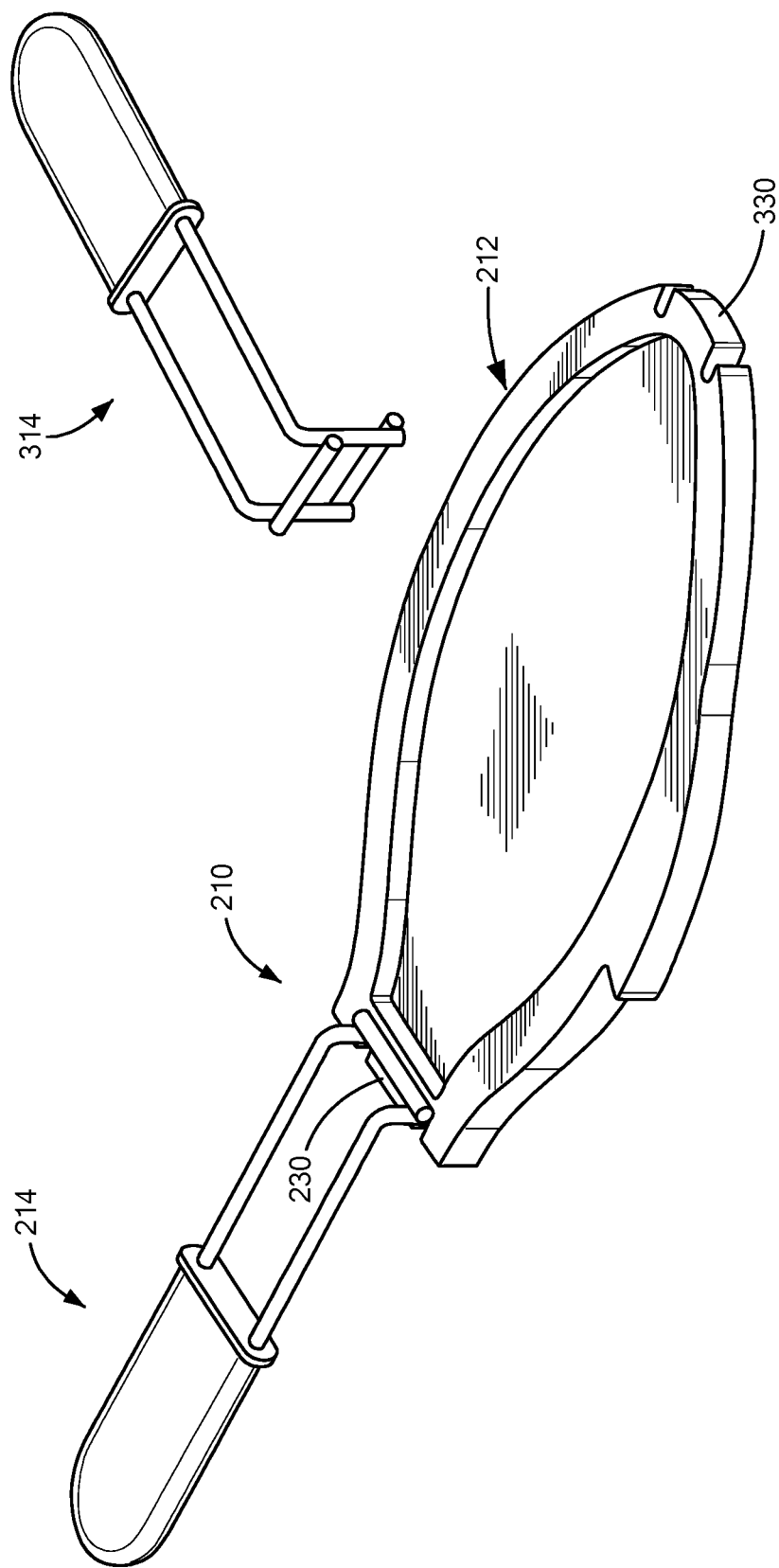
FIG. 4 is a perspective view of another embodiment of the cookware system with removable handles shown with a fish-shaped cookware member.

In an alternate embodiment, shown in FIG. 4, the cookware member may have a decorative shape, such as the fish-shaped cookware member 212 of cookware system 210. Similar to the other embodiments, first removable handle 214 and second removable handle 314 may be included. In this embodiment, cookware member is fabricated as a flat cooking stone, which may be made of a non-metallic material, such as ceramic. While it is well-suited to cook fish on a grill, of course, other foods may be cooked on it as well. Cookware member 212 includes two notches, namely notch 230 and 330, which are configured to receive removable handles 214 and 314, respectively.

Figure 5:
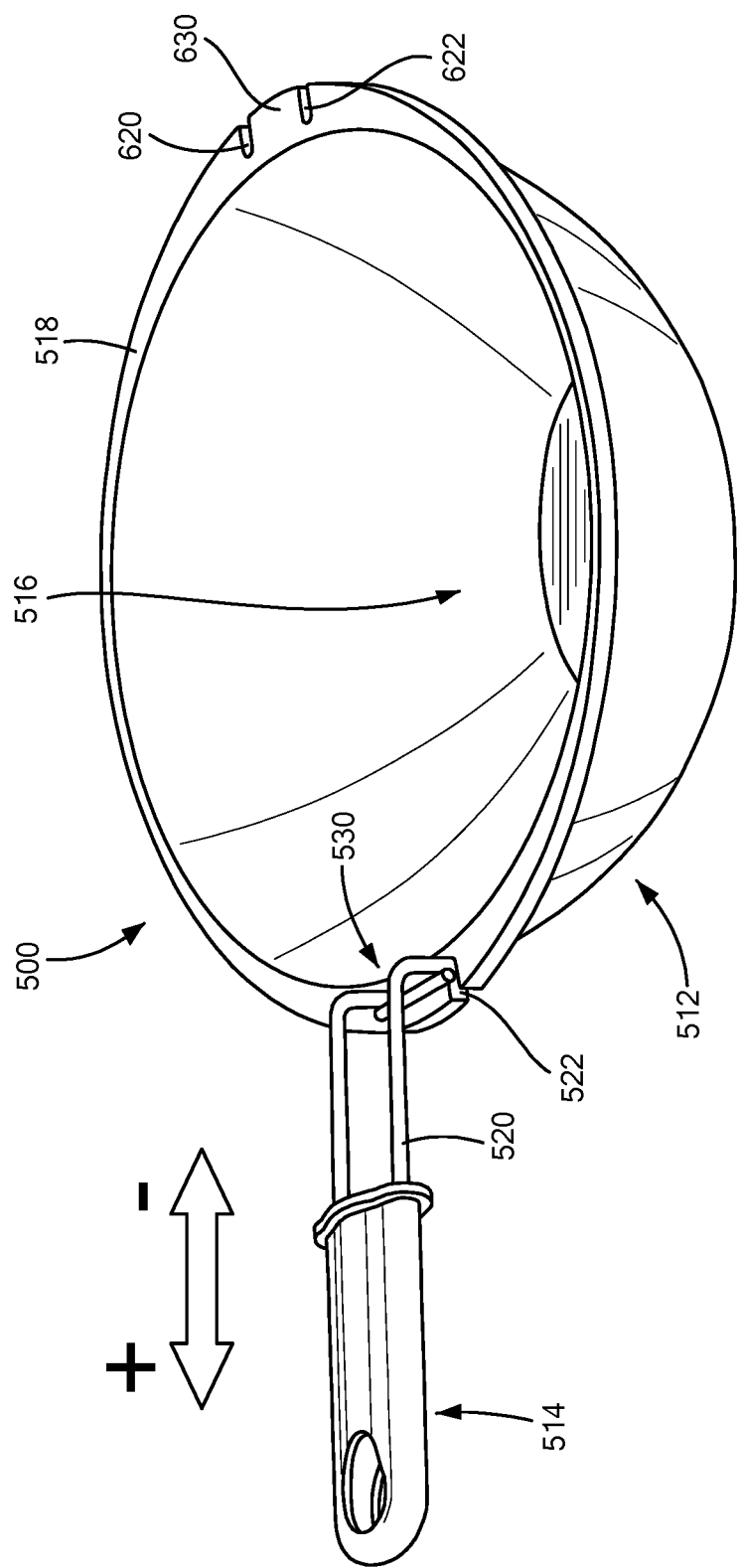
FIG. 5 is a perspective view of another embodiment of the cookware system with removable handles shown with a wok-shaped cookware member.

In yet another embodiment shown in FIG. 5, there is shown a cookware system 500 which includes a metallic cookware member 512 and a first removable handle 514. Cookware member 512 is in the form of a wok, but it could be in the form of a pot, pan, or other metallic or non-metallic piece of cookware. The first removable handle 514 may be of the same design as handles 14 and 114 described above. Moreover, while not depicted in FIG. 5, another handle may be used with the first removable handle 514 if the wok and/or food being prepared is heavy and requires two hands to manipulate cookware member 512.

Cookware member 512 includes an internal region 516, which in this case is a bowl shaped surface on which food may be heated. There is an outer edge 518 disposed about the perimeter of the cookware member 512. In a first portion of outer edge 518 there is formed a first pair of adjacent slots 520 and 522, which extend through the thickness of the cookware member 512 and extend inwardly from the perimeter towards the internal region 516. The first pair of slots 520 and 522 define a first notch 530. The removable handle 514 may be engaged with the first notch 530 in the same manner as the handles 14 and 114 engage with first notch 30 of cookware member 512 in FIG. 1A. A second pair of slots 620 and 622 defining a second notch 630, may be included to receive a removable handle to manipulate cookware member 512, if desired.

Figure 6:
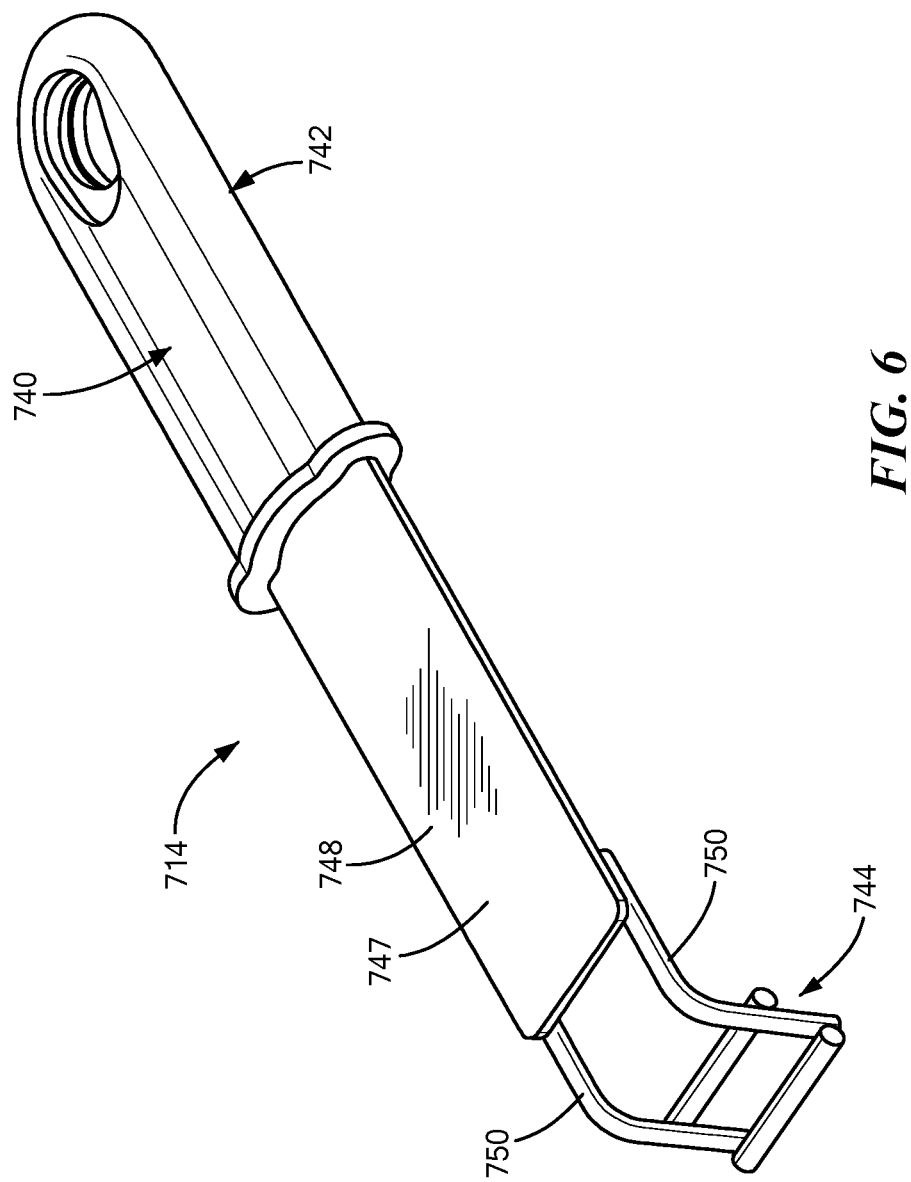
FIG. 6 is a perspective view of another embodiment of the removable handle according to another aspect of this disclosure.

An alternative design for a removable handle is depicted in FIG. 6. This handle may be used with the various cookware members described herein in place of the other removable handles depicted. Instead of separate legs 70/72 of removable handle 14, shown in FIG. 1A, which form the extension member 48 (FIG. 2A), removable handle 714, utilizes a single monolithic metallic structure 747 to form the extension member 748. Extension member 748 interconnects handle member 742 with engagement member 744 in this embodiment. The monolithic metallic structure 747 may extend into grip member 740 over which may be disposed a grip or handle made of plastic or other suitable material to provide good thermal insulation and to form an exterior surface of grip member 740. Legs 750 and 752 of engagement member 744 may be affixed to a surface of monolithic metallic structure 747.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A cookware system, comprising:
   a cookware member, including an internal region for heating food and an outer edge disposed about a perimeter of the cookware member; the outer edge including a first pair of adjacent slots extending through a thickness of the outer edge and extending inwardly from the perimeter, the first pair of slots defining a first notch having a top surface and a bottom surface; and
   a first removable handle, including a grip member at a first end, an engagement member at a second end, and an extension member interconnecting the grip member to the engagement member; wherein the engagement member includes a first leg, a second leg, a first crossbar, and a second crossbar; and wherein the first crossbar is interconnected between the first leg and the second leg and the second crossbar is spaced from the first crossbar and interconnected between the first leg and the second leg;
   wherein the first removable handle is configured to removeably connect with the cookware member when the first leg of the engagement member is inserted into one of the slots of the first pair of adjacent slots in the outer edge of the cookware member and the second leg of the engagement member is inserted into the other of the slots of the first pair of adjacent slots in the outer edge of the cookware member and when the first crossbar member engages with a the top surface of the first notch and the second crossbar member engages with the bottom surface of the first notch;
   wherein the extension member of the first removable handle includes a longitudinal axis and wherein the first and second legs of the engagement member extend in a direction which is transverse to the longitudinal axis of the extension member; and
   wherein the first and second legs of the engagement member each include curved portions extending from the extension member, which transition to straight portions, and wherein the first crossbar member and the second crossbar member connect to the straight portions of the first and second leg members.

2. The cookware system of claim 1 wherein the first cross bar is spaced from the second cross bar along a length of the first and second legs and wherein the first cross bar is offset from the second crossbar in a direction perpendicular to the length of the first and second legs.

3. The cookware system of claim 1 wherein the extension member includes a first leg and a second leg, which, respectively, interconnect with the first leg and the second leg of the engagement member.

4. The cookware system of claim 1 wherein the extension member comprises a monolithic member, and wherein the first leg and the second leg of the engagement member interconnect with the monolithic member.

5. The cookware system of claim 1 wherein the bottom surface of the first notch includes a groove configured to receive the second crossbar member.

6. The cookware system of claim 1, wherein the outer edge of the cookware member further includes a second pair of adjacent slots extending through the thickness of the outer edge and extending inwardly from the perimeter, the second pair of slots defining a second notch having a top surface and a bottom surface; the cookware system further including a second removable handle including a grip member at a first end, an engagement member at a second end, and an extension member, interconnecting the grip member to the engagement member; wherein the engagement member includes a first leg, a second leg, a first crossbar and a second crossbar; and wherein the first crossbar is interconnected between the first leg and the second leg and the second crossbar is spaced from the first crossbar and interconnected between the first leg and the second leg; and wherein the second removable handle is configured to removeably connect with the cookware member when the first leg of the engagement member is inserted into one of the slots of the second pair of adjacent slots in the outer edge of the cookware member and the second leg of the engagement member is inserted into the other of the slots of the second pair of adjacent slots in the outer edge of the cookware member and when the first crossbar member engages with a the top surface of the second notch and the second crossbar member engages with the bottom surface of the second notch.

7. The cookware system of claim 6 wherein the extension member of the second removable handle includes a longitudinal axis and wherein the first and second legs of the engagement member extend in a direction which is transverse to the longitudinal axis of the first removable handle.

8. The cookware system of claim 7 wherein the first cross bar is spaced from the second cross bar along a length of the first and second legs and wherein the first cross bar is offset from the second crossbar in a direction perpendicular to the length of the first and second legs.

9. The cookware system of claim 7 wherein the first and second legs of the engagement member each include curved portions extending from the extension member, which transition to straight portions, and wherein the first crossbar member and the second crossbar member connect to the straight portions of the first and second leg members.

10. The cookware system of claim 9 wherein the extension member includes a first leg and a second leg, which, respectively, interconnect with the first leg and the second leg of the engagement member.

11. The cookware system of claim 9 wherein the extension member comprises a monolithic member, and wherein the first leg and the second leg of the engagement member interconnect with the monolithic member.

12. The cookware system of claim 6 wherein the bottom surface of the second notch includes a groove configured to receive the second crossbar member.

13. The cookware system of claim 6 wherein the grip member of the first removable handle extends outwardly away from the outer edge and internal region of the cookware member and the grip member of the second removable handle extends outwardly away from the outer edge and internal region of the cookware member, such that the user can grasp the grip member of the first removable handle with the a first hand and simultaneously grasp the grip member of the second removable handle with a second hand to enable two handed lifting of the cookware member.

14. The cookware system of claim 6 wherein the grip member of the first removable handle includes an orifice configured to receive a first digit of a user and the grip member of the second removable handle includes an orifice configured to receive a thumb of a user; and wherein the first removable handle and the second removable handle are configured to rotate up and inwardly toward the interior region of the cookware member, such that the user can engage the orifice in the in the grip member of the first removable handle with the first digit and simultaneously engage the orifice in the in the grip member of the second removable handle with the thumb to enable one handed lifting of the cookware member.

15. The cookware system of claim 1 wherein the first notch and the second notch are disposed opposite each other about the perimeter of the cookware member.

16. The cookware system of claim 1 wherein the cookware member is one of circular, square, rectangular, non-geometric, or decorative in shape.

17. The cookware system of claim 1 wherein the outer edge of the cookware member and the internal region are substantially co-planar and in the form of a substrate.

18. The cookware system of claim 1 wherein the cookware member is formed of one of a metallic or a non-metallic material.

19. The cookware system of claim 1 wherein the cookware member is one of a ceramic stone, a pot, a pan, or a wok.

* * * * *

UNITED STATES PATENT AND TRADEMARK OFFICE
CERTIFICATE OF CORRECTION

PATENT NO. : 11,690,483 B2
APPLICATION NO. : 17/377975
DATED : July 4, 2023
INVENTOR(S) : Carlos Jose Latre Navarro It is certified that error appears in the above-identified patent and that said Letters Patent is hereby corrected as shown below:

In the Claims

In Column 8, Line 51:
Replace "a the top surface" with --the top surface--

In Column 8, Lines 65-66:
Replace "cross bar" with --crossbar--

In Column 8, Line 66:
Replace "cross bar" with --crossbar--

In Column 8, Line 67:
Replace "cross bar" with --crossbar--

In Column 9, Lines 36-37:
Replace "a the top surface" with --the top surface--

In Column 9, Lines 45-46:
Replace "cross bar" with --crossbar--

In Column 9, Line 46:
Replace "cross bar" with --crossbar--

In Column 9, Line 47:
Replace "cross bar" with --crossbar--

Signed and Sealed this
Twenty-eighth Day of November, 2023

Katherine Kelly Vidal
*Director of the United States Patent and Trademark Office*